US011023339B2

(12) United States Patent
Smeaton et al.

(10) Patent No.: US 11,023,339 B2
(45) Date of Patent: Jun. 1, 2021

(54) ASYNCHRONOUS REMOTE MIRROR CLOUD ARCHIVAL (71) Applicant: International Business Machines Corporation, Armonk, NY (US)

(72) Inventors: Corey G. Smeaton, Chelmsford, MA (US); Nadim P. Shehab, Tucson, AZ (US); Max D. Smith, Tucson, AZ (US); Bard A. Doster, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/776,457

(22) Filed: Jan. 29, 2020

(65) Prior Publication Data
US 2020/0167250 A1 May 28, 2020

Related U.S. Application Data (63) Continuation of application No. 15/997,466, filed on Jun. 4, 2018, now Pat. No. 10,592,363.

(51) Int. Cl.
*G06F 12/00* (2006.01)
*G06F 11/20* (2006.01)
(Continued)

(52) U.S. Cl.
CPC .......... *G06F 11/2074* (2013.01); *G06F 3/065* (2013.01); *G06F 3/067* (2013.01);
(Continued)

(58) Field of Classification Search
CPC .... G06F 11/2074; G06F 3/0614; G06F 3/065; G06F 3/067; G06F 11/1451; G06F 11/1464; G06F 2201/85
See application file for complete search history.

(56) References Cited

U.S. PATENT DOCUMENTS 7,603,581 B2 * 10/2009 Boyd .................. G06F 11/2058
714/13
8,352,431 B1 1/2013 Protopopov et al.
(Continued)

FOREIGN PATENT DOCUMENTS

EP  0674263  9/1995

OTHER PUBLICATIONS

Anonymous, "A Method to Manage Multiple Target Backup for Mobile Device", dated Nov. 24, 2015, an IP.com Prior Art Database Technical Disclosure, (available at: http://ip.com/IPCOM/000244210D), Total 5 pages.
(Continued)

Primary Examiner — John A Lane
(74) Attorney, Agent, or Firm — Konrad, Raynes, Davda and Victor LLP; Janaki K. Davda (57) ABSTRACT Provided are techniques for asynchronous remote mirror cloud archival. A data mover of a remote host receives, from an asynchronous remote mirror copy system of a primary storage controller, an archive copy operation, wherein the archive copy operation identifies a list of tracks of data and a location of cloud storage in a cloud infrastructure for storing the data from the tracks. The data mover issues, to a secondary storage controller, the archive copy operation, wherein the secondary storage controller archives the data from secondary storage to the cloud storage by invoking a cloud service, wherein the secondary storage stores data of primary storage of the primary storage controller.

20 Claims, 9 Drawing Sheets (51) Int. Cl.
*G06F 3/06* (2006.01)
*G06F 11/14* (2006.01)

(52) U.S. Cl.
CPC ........ *G06F 3/0614* (2013.01); *G06F 11/1451* (2013.01); *G06F 11/1464* (2013.01); *G06F 2201/85* (2013.01)

(56) References Cited

U.S. PATENT DOCUMENTS

| | | | |
|---|---|---|---|
| 9,384,254 | B2 | 7/2016 | Tekade et al. |
| 9,405,628 | B2 | 8/2016 | Blea et al. |
| 9,684,659 | B1 | 6/2017 | Protopopov et al. |
| 9,720,786 | B2* | 8/2017 | Crockett ............. G06F 11/2074 |
| 9,747,169 | B2 | 8/2017 | Kottomtharayil et al. |
| 10,042,710 | B2 | 8/2018 | Mutalik et al. |
| 10,459,806 | B1* | 10/2019 | He ....................... G06F 11/1464 |
| 2006/0005074 | A1* | 1/2006 | Yanai ....................... G06F 3/061 714/6.32 |
| 2010/0122184 | A1* | 5/2010 | Vonog ................... G06F 3/0486 715/753 |
| 2010/0332454 | A1 | 12/2010 | Prahlad et al. |
| 2011/0179415 | A1* | 7/2011 | Donnellan .......... G06F 9/45558 718/1 |
| 2012/0254119 | A1 | 10/2012 | Kumarasamy et al. |
| 2014/0006357 | A1 | 1/2014 | Davis et al. |
| 2014/0075021 | A1* | 3/2014 | Revanuru ............... H04L 43/04 709/224 |
| 2014/0351214 | A1* | 11/2014 | Abercrombie ........ G06F 16/137 707/626 |
| 2015/0142739 | A1 | 5/2015 | Mutalik et al. |
| 2016/0048408 | A1* | 2/2016 | Madhu ................ G06F 11/2023 718/1 |
| 2016/0162371 | A1 | 6/2016 | Prabhu et al. |
| 2017/0262350 | A1* | 9/2017 | Dornemann ........ G06F 11/1658 |
| 2018/0260583 | A1* | 9/2018 | Doerner ................ H04L 9/0894 |
| 2018/0349042 | A1* | 12/2018 | Brown ................... G06F 3/067 |
| 2019/0355483 | A1* | 11/2019 | Smurro ................ H04L 65/1069 |
| 2020/0125412 | A1* | 4/2020 | Singh .................... G06F 3/0647 |
| 2020/0301785 | A1* | 9/2020 | Doster ................. G06F 16/273 |
| 2020/0327016 | A1* | 10/2020 | Kumarasamy ...... G06F 11/1451 |

OTHER PUBLICATIONS

Anonymous, "A Simple and Cost Effective Method for Managing a Solution as a Service Application in a Managed Storage and Archiving Cloud Environment", dated Oct. 2, 2013, an IP.com Prior Art Database Technical Disclosure, (available at: http://ip.com/IPCOM/000231486D), Total 8 pages.

Anonymous, "Method for Enabling Dynamic and Transparent Configuration of Data Management in a Multi-Cloud Multi-Tenancy Storage Service", dated Mar. 15, 2012, an IP.com Prior Art Database Technical Disclosure, (available at: http://ip.com/IPCOM/000215900D), Total 3 pages.

Anonymous, "Method to Improve Remote Copy Bandwidth Utilization by Only Mirroring Byte Level Changes", dated Jul. 5, 2012, an IP.com Prior Art Database Technical Disclosure, (available at: http://ip.com/IPCOM/000219530D), Total 7 pages.

Mell et al., "Effectively and Securely Using the Cloud Computing Paradigm" dated Oct. 7, 2009, NIST, Information Technology Laboratory, Total 80 pages.

Mell et al., "Recommendations of the National Institute of Standards and Technology", dated Sep. 2011, The NIST Definition of Cloud Computing, Total 7 pages.

"NetApp® E-Series Storage Systems", Mirroring Feature Guide, dated May 2015, (available at: www.netapp.com/e-series), Total 27 pages.

List of IBM Patents or Patent Applications Treated as Related, Total 2 pages, Jan. 29, 2020.

Application for U.S. Appl. No. 15/997,466, filed Jun. 4, 2018, Total 36 pages.

Notice of Allowance dated Nov. 4, 2019, Total 14 pages, for U.S. Appl. No. 15/997,466, filed Jun. 4, 2018.

\* cited by examiner

ASYNCHRONOUS REMOTE MIRROR CLOUD ARCHIVAL

BACKGROUND

1. Field of the Invention

Embodiments of the invention relate to asynchronous remote mirror cloud archival.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems, which may be geographically dispersed. Thus, data from a host to be stored in the data storage system is typically directed to a primary system at a local site and then replicated to a secondary system, which may be geographically remote from the primary system.

The process of replicating, that is, copying data over to the secondary system may be set up in either a synchronous or an asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed.

Some storage systems employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices. Storage controllers may also be referred to as storage control units.

Enterprise clients with high availability use mirroring technology at extended distance for disaster recovery. These clients may also use cloud storage to archive data, but the increased network strain of storing data to the cloud storage from application sites may impact business operations. Current cloud archive technology also requires users to know cloud constructs in order to archive data to cloud storage.

SUMMARY

In accordance with embodiments, a computer program product is provided for asynchronous remote mirror cloud archival. The computer program product comprising a computer readable storage medium having program code embodied therewith, the program code executable by at least one processor to perform operations. In accordance with these embodiments, a data mover of a remote host receives, from an asynchronous remote mirror copy system of a primary storage controller, an archive copy operation, where the archive copy operation identifies a list of tracks of data and a location of cloud storage in a cloud infrastructure for storing the data from the tracks. Also, the data mover issues, to a secondary storage controller, the archive copy operation, where the secondary storage controller archives the data from secondary storage to the cloud storage by invoking a cloud service, where the secondary storage stores data of primary storage of the primary storage controller.

In accordance with additional embodiments, a computer system is provided for asynchronous remote mirror cloud archival. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. In accordance with these embodiments, a data mover of a remote host receives, from an asynchronous remote mirror copy system of a primary storage controller, an archive copy operation, where the archive copy operation identifies a list of tracks of data and a location of cloud storage in a cloud infrastructure for storing the data from the tracks. Also, the data mover issues, to a secondary storage controller, the archive copy operation, where the secondary storage controller archives the data from secondary storage to the cloud storage by invoking a cloud service, where the secondary storage stores data of primary storage of the primary storage controller.

In accordance with further embodiments, a computer-implemented method is provided for asynchronous remote mirror cloud archival. In accordance with these embodiments, a data mover of a remote host receives, from an asynchronous remote mirror copy system of a primary storage controller, an archive copy operation, where the archive copy operation identifies a list of tracks of data and a location of cloud storage in a cloud infrastructure for storing the data from the tracks. Also, the data mover issues, to a secondary storage controller, the archive copy operation, where the secondary storage controller archives the data from secondary storage to the cloud storage by invoking a cloud service, where the secondary storage stores data of primary storage of the primary storage controller.

These embodiments allow for clients to archive data from a remote site to cloud storage, thereby reducing their total storage needs at the application host at an application site. Also, these embodiments avoid network impact of the application site by using the network of the remote site to offload data to cloud storage, instead of offloading the data to cloud storage from the application site.

In additional embodiments, the primary storage controller receives an asynchronous remote mirror cloud archival copy operation from an application host. This allows the asynchronous remote mirror cloud archival copy operation to originate from the application site, even though the data is to be archived from the remote site.

In other additional embodiments, the asynchronous remote mirror cloud archival copy operation describes the list of tracks of data to be archived and the location in the cloud storage to store the data. This allows for efficient identification of data to be archived from tracks of a volume into cloud storage.

In further embodiments, the secondary storage controller converts the data in the list of tracks into objects for storage in the cloud storage. This allows for the data to be stored in cloud storage in a different format than it was stored in volumes.

In yet additional embodiments, any of the primary storage controller and the secondary storage controller receive a request to retrieve objects from the cloud storage from any of an application host and the remote host. This enables retrieval of the data from the cloud storage from either the primary storage controller or the secondary storage controller, even thought the secondary storage controller archived the data.

In yet further embodiments, the archive copy operation comprises a store record set command. This allows for use of an existing store record set command without creating a new command. Also, the store record set command includes a Track Information Field (TIF) with a list of tracks of data to be archived and includes describes (e.g., with metadata) where the tracks of data are to be archived for efficient indication of data to be archived and where it is to be archived.

In yet other embodiments, the cloud storage is coupled to the cloud service that stores data into the cloud storage and retrieves data from the cloud storage. This allows for use of the cloud service to store and retrieve the data from the cloud storage.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

With embodiments, application sites use remote mirroring technology to perform an asynchronous remote mirror cloud archival. With embodiments, a client issues an asynchronous remote mirror cloud archival copy operation at an application site (which includes an application host and a primary system) without knowledge of the cloud constructs, and the data is archived to the cloud storage from a remote host of a remote site (e.g., a disaster recovery site), instead of from the application host.

Advantageously, embodiments allow for clients to archive data to cloud storage, thereby reducing their total storage needs at the application host. Advantageously, embodiments also prevent application network impact by using the network of the remote site to offload data to cloud storage, instead of offloading the data to cloud storage from the application site and impacting the network of the application site.

Figure 1:
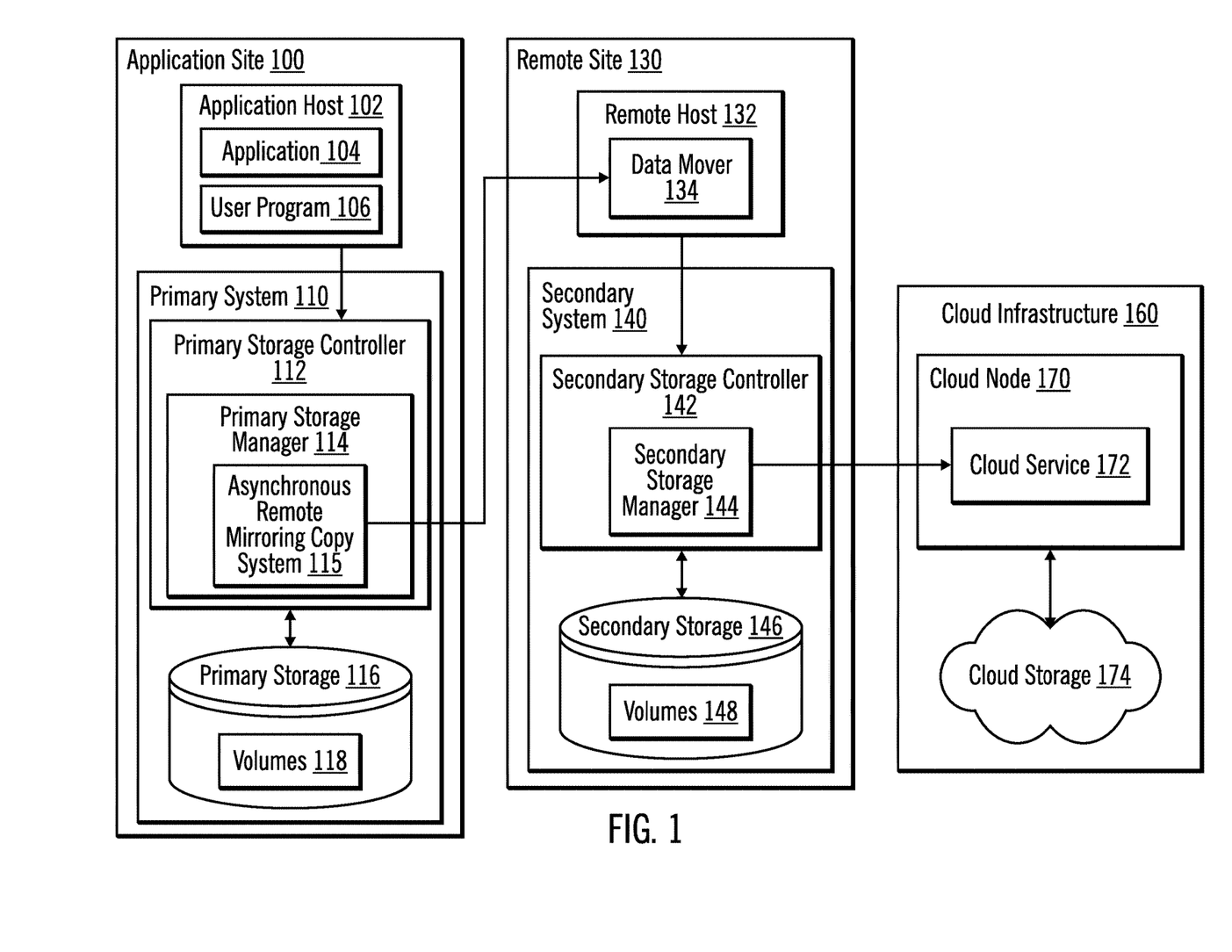
FIG. 1 illustrates, in a block diagram, a computing environment with an application site, a remote site, and a cloud infrastructure in accordance with certain embodiments.

FIG. 1 illustrates, in a block diagram, a computing environment with an application site 100, a remote site 130, and a cloud infrastructure 160 in accordance with certain embodiments. The application site 100 may be referred to as a primary site, and the remote site 130 may be referred to as a secondary site.

The application site 100 includes an application host 102 and a primary system 110. The application host 102 includes an application 104 and a user program 106. In certain embodiments, the user program 106 represents data set services. The primary system 110 includes a primary storage controller 112 coupled to primary storage 116. The primary storage controller 112 includes a primary storage manager 114, which includes an asynchronous remote mirror copy system 115. The primary storage 116 includes volumes 118. The volumes 118 include tracks of data.

The remote site 130 includes a remote host 132 and a secondary system 140. The remote host 132 includes a data mover 134. The secondary system 140 includes a secondary storage controller 142 coupled to secondary storage 146. The secondary storage controller 142 includes a secondary storage manager 144. The secondary storage 146 includes volumes 148. The volumes 148 include tracks of data.

The cloud infrastructure 160 includes a cloud node 170, which includes a cloud service 172 coupled to cloud storage 174. The cloud storage 174 stores data as objects, and each of the objects includes one or more tracks of data.

The application host 102 is coupled to the primary storage controller 112. The application 104 executing on the application host 102 may submit Input/Output (I/O) requests to the primary storage controller 112 to access data at volumes 118 in primary storage 116.

The remote host 132 is coupled to the secondary storage controller 116. The data mover 134 executing on the remote host 132 issues an archive copy operation to the secondary storage controller 116 to move data from the secondary storage 146 to the cloud storage 174.

With embodiments, the volumes 118, 148 may be, for example, Logical Unit Numbers, Logical Devices, Logical Subsystems, etc. The primary storage 116 and the secondary storage 146 may be storage drives.

With embodiments, the application site 100 may be geographically or functionally remote from the remote site 130 and from the cloud infrastructure 160. Thus, in such embodiments, the application site 100 may be at a local site. In such embodiments, the remote site 130 and the cloud infrastructure 160 may be at geographically remote (e.g., separated by a short or long geographical distance) from the application site 100 and from each other. Alternatively, the application site 100, the remote site 130, and/or the cloud infrastructure 160 may be relatively close.

As used herein, the term track may refer to a track of a disk storage unit, but may also reference to other units of data (or data units) configured in the storage 116, 146, such as a bit, byte, word, segment, page, block (such as a Logical Block Address (LBA)), etc., which may be a part of a larger grouping of data units, such as those stored collectively as a volume, logical device, etc. of data.

In certain embodiments, the storage devices 116, 146 may be comprised of one or more sequential access storage devices, such as hard disk drives and magnetic tape or may include non-sequential access storage devices such as solid state drives (SSD), for example. Each storage device 116, 146 may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The system components 102, 112, 116, 132, 142, 146, 170, 174 are connected via one or more networks, which enables communication among these components. Thus, each of the one or more networks may include a fabric that may comprise a Storage Area Network (SAN), Local Area Network (LAN), Intranet, the Internet, Wide Area Network (WAN), peer-to-peer network, wireless network, arbitrated loop network, etc.

Communication paths to and from the application host 102 and the remote host 132 may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 2:
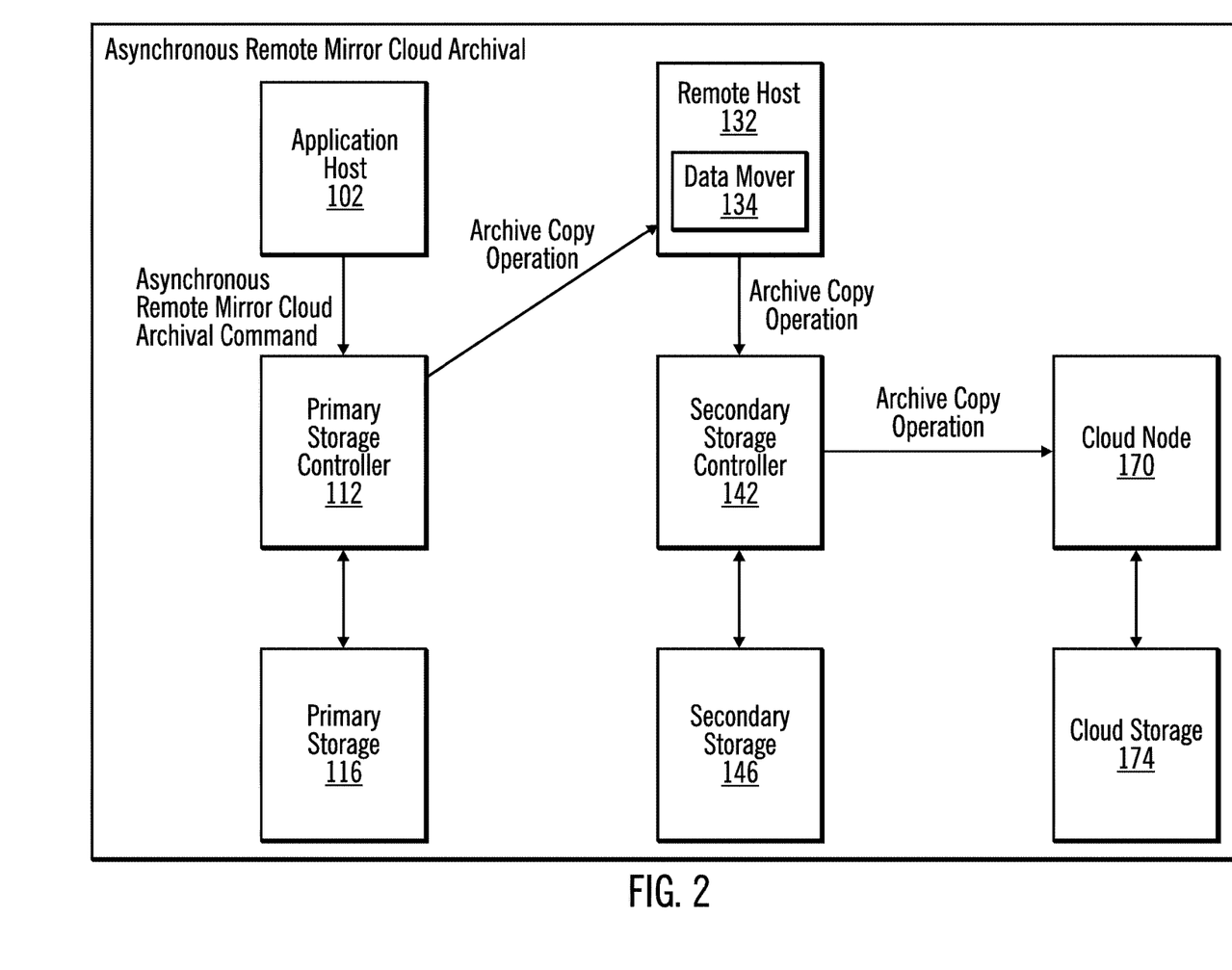
FIG. 2 illustrates a flow of operations and data for an asynchronous remote mirror cloud archival copy operation in accordance with certain embodiments.

FIG. 2 illustrates a flow of operations and data for an asynchronous remote mirror cloud archival copy operation in accordance with certain embodiments. In FIG. 2, the application host 102 issues an asynchronous remote mirror cloud archival copy operation to the primary storage controller 112. The asynchronous remote mirror copy system 115 at the primary storage controller 112 sends an archive copy operation identifying a list of tracks of data to be archived and where, in the cloud infrastructure 100, to store the tracks of data to the data mover 134. The data mover 134 issues the archive copy operation to the secondary storage controller 142. The secondary storage controller 142 executes the archive copy operation to copy data from the secondary storage 146 to the cloud storage 174.

Advantageously, embodiments allow for the application host 102 to archive data to cloud storage 174, thereby reducing the total storage need at the host application 102. Advantageously, embodiments use the network between the secondary storage 146 and the cloud storage 174 to move data, which prevents application network impact at the application site 100.

With embodiments, there is an asynchronous remote mirror relationship between the primary storage 116 and the secondary storage 146 so that data from the primary storage 116 is copied to the secondary storage 146. Then, when the application host 102 wants to archive data, the copy of the data at the secondary storage 146 is archived to the cloud storage 174. With embodiments, the updates to secondary volumes are applied in time order. With embodiments, the updates that were applied at the primary storage controller 112 at the time of the asynchronous remote mirror cloud archival copy operation, would already be applied at the secondary storage controller 142 at the time the archive copy operation is issued from the remote host 132.

Figure 3:
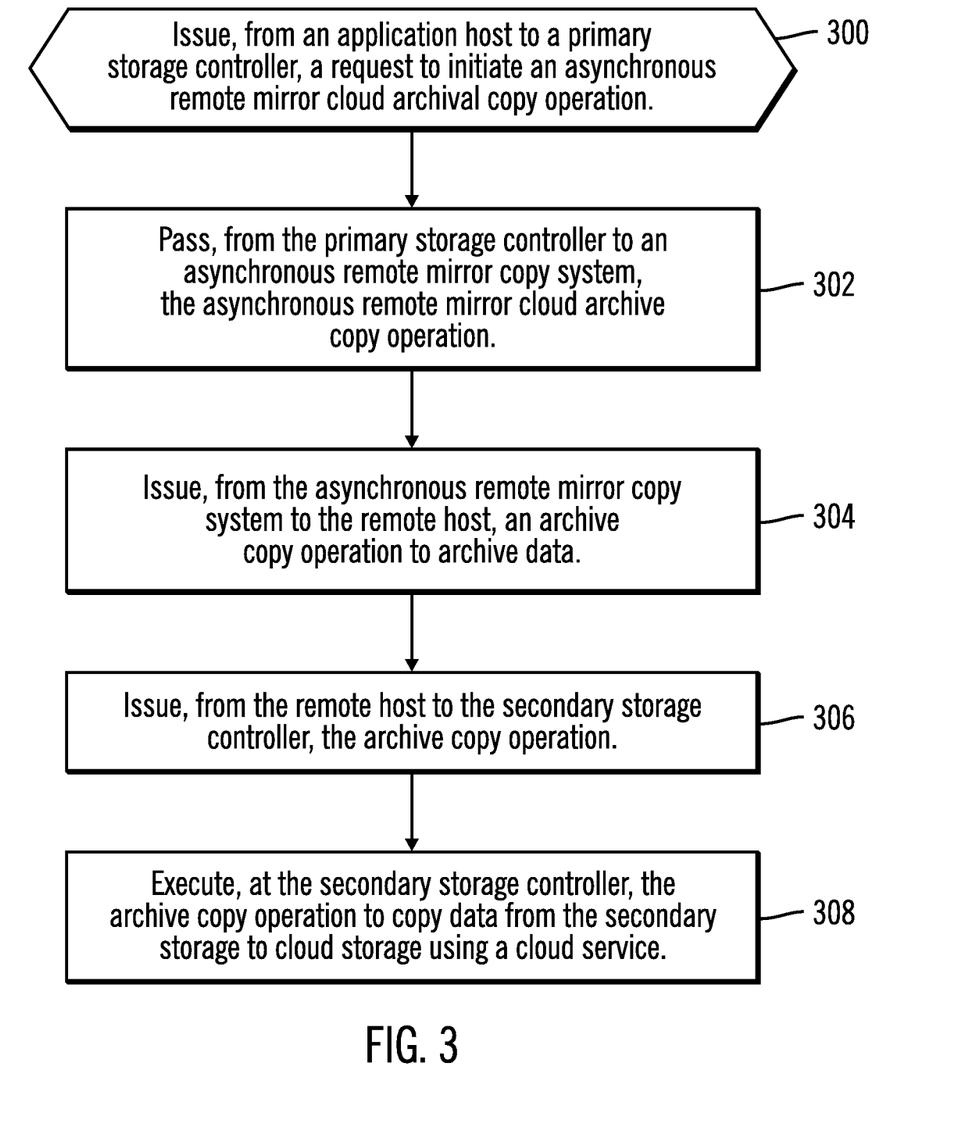
FIG. 3 illustrates, in a flow chart, operations for executing an asynchronous remote mirror cloud archival copy operation in accordance with certain embodiments.

FIG. 3 illustrates, in a flow chart, operations for executing an asynchronous remote mirror cloud archival copy operation in accordance with certain embodiments.

Control begins at block 300 with the application host 102 issuing, to the primary storage controller 112, a request to initiate an asynchronous remote mirror cloud archival copy operation. In block 302, the primary storage controller 112 passes, to an asynchronous remote mirror copy system 115, the asynchronous remote mirror cloud archive copy operation.

In block 304, the asynchronous remote mirror copy system 115 issues, to the remote host 132, an archive copy operation to archive data. With embodiments, the archive copy operation is a store record set command, and the store record set command includes a Track Information Field (TIF) with a list of tracks of data to be archived and includes describes (e.g., with metadata) where the tracks of data are to be archived.

In block 306, the remote host 132 issues, to the secondary storage controller 142, the archive copy operation. In block 308, the secondary storage controller 142 executes the archive copy operation to copy the data (i.e., the tracks of data from the TIF) from the secondary storage to the cloud storage 174 using the cloud service 172.

In certain embodiments, the secondary storage controller 142 notifies the remote host 132 when the archive copy operation has completed successfully (and the data has been archived to the cloud storage 174). The notification is then propagated from the remote host 132 to the primary storage controller 112 and from the primary storage controller 112 to the application host 102.

Figure 4:
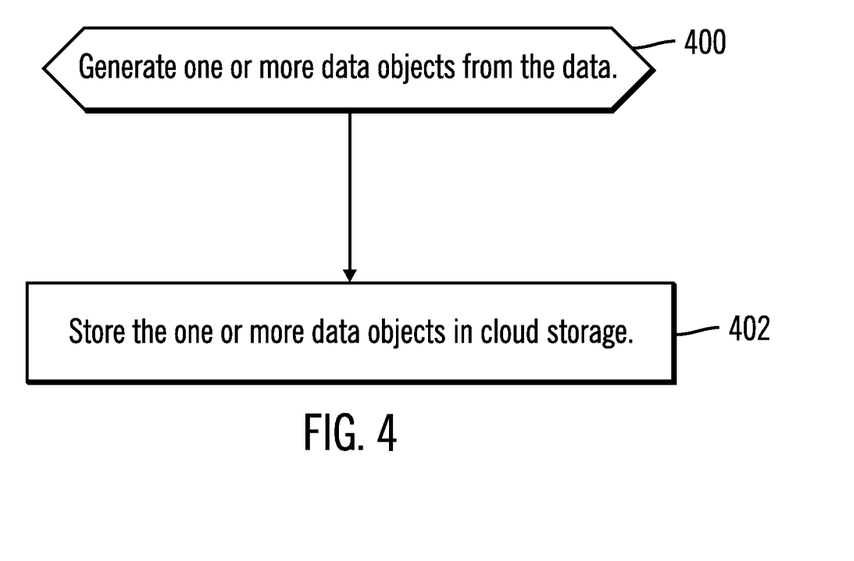
FIG. 4 illustrates, in a flow chart, operations for executing an archive copy operation in accordance with certain embodiments.

FIG. 4 illustrates, in a flow chart, operations for executing an archive copy operation in accordance with certain embodiments. Control begins at block 400 with the secondary storage controller 142 generating one or more data objects from the data. That is the tracks of data (from volumes in the secondary storage 148) identified in the TIF are grouped to form the data objects. This is because the cloud storage 174 stores objects, rather than volumes with tracks. In block 402, the secondary storage controller 142 stores the one or more data objects in the cloud storage 174. With embodiments, this is done by sending the one or more data objects to the cloud service 172 that actually stores the objects in the cloud storage 174. In certain embodiments, the metadata may also be stored in one or more objects.

Figure 5:
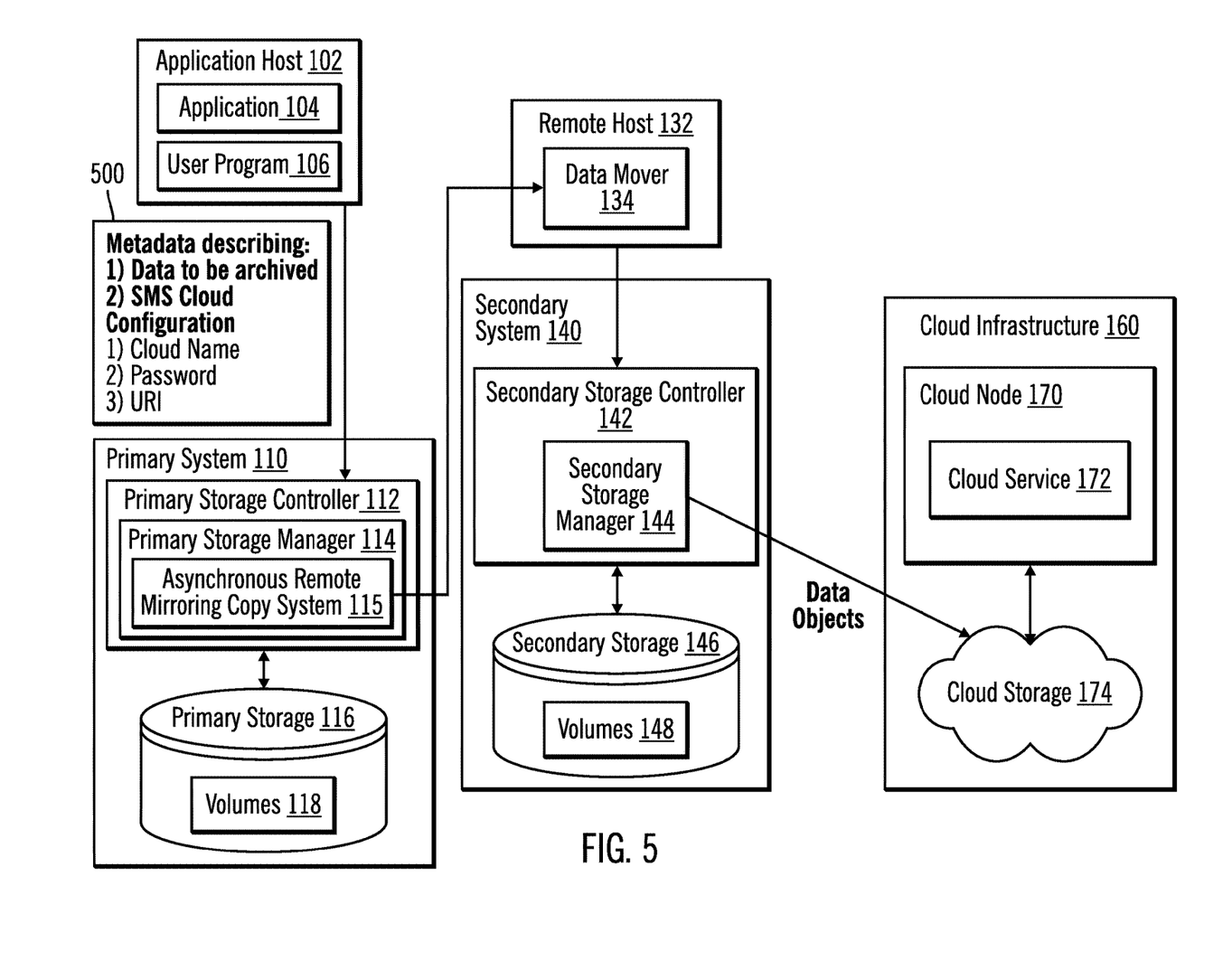
FIG. 5 illustrates use of an asynchronous remote mirror copy system to archive data in cloud storage in accordance with certain embodiments.

FIG. 5 illustrates use of an asynchronous remote mirror copy system to archive data in cloud storage in accordance with certain embodiments. With asynchronous remote mirror cloud archival, an asynchronous remote mirror cloud archival copy operation 500 is issued by the user program 106 at the application host 102 to the primary storage manager 114 at the primary storage controller 112. The asynchronous remote mirror cloud archival copy operation 500 identifies, via metadata, 1) the data (e.g., tracks) to be archived and 3) System Managed Storage (SMS) cloud configuration. The SMS cloud configuration identifies where to store the archived data by providing a cloud name to identify particular cloud storage, a password to access the cloud storage, and a Uniform Resource Identifier (URI) of the location at which the data is to be archived in the cloud storage.

SMS is a set of protocols for how data is stored on a system (e.g., when deleted, moved to tape/cloud/lower level DASD, backed up, etc.). In certain embodiments, the user program 106 is a program at the application host level. The metadata passed by the user program 106 contains information about the data to be archived and the cloud configuration. The primary storage controller 112 recognizes that the asynchronous remote mirror cloud archival copy operation 500 is to be passed to the asynchronous remote mirror copy system 115. The asynchronous remote mirror copy system 115 creates the TIF. Within that TIF is all the data passed in from the user program 106 regarding the request for archive. The asynchronous remote mirror copy system 115 processes that TIF and issues an archive copy operation, to the remote host 132, to archive the data.

In certain embodiments, the asynchronous remote mirror copy system 115 issues a store record set command as an archive copy operation to the data mover 134. In certain embodiments, the store record set command is a request to archive data to the cloud storage issued via an Application Programming Interface (API). The store record set command includes the TIF with a list of tracks of data to be archived and includes metadata describing where the tracks of data are to be archived. In certain embodiments, the data mover 134 is a system data mover/asynchronous operations manager.

Then, the data mover 134 issues the store record set command to the secondary storage manager 144 of the secondary storage controller 142. The store record set command describes the cloud constructs of the cloud storage. With embodiments, the store record set command includes a store record set identifying the data to be archived and where the data should be archived within the cloud infrastructure 160. With embodiments, the store record set command also includes the SMS cloud configuration.

Embodiments remotely issue commands to execute the archival of data to the remote cloud system from the secondary storage controller (i.e., disaster recovery site). In certain embodiments, the data mover 134 issues a Channel Command Word (CCW) that identifies tracks to be archived to the secondary storage 146 to move data from the tracks to the cloud storage 174. The secondary storage manager 144 uses the track identifiers to locate data in tracks of the secondary storage 146, generates objects with data from the tracks, and stores these objects into the cloud storage 174 identified by the SMS cloud configuration.

Figure 6:
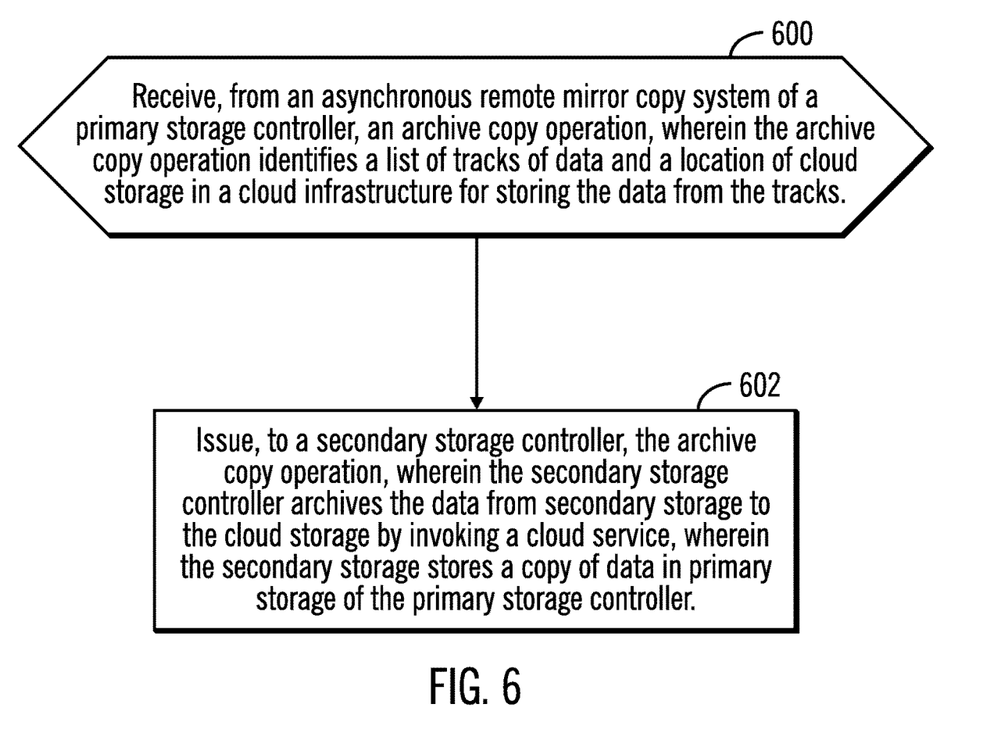
FIG. 6 illustrates, in a flow chart, operations for archiving data in accordance with certain embodiments.

FIG. 6 illustrates, in a flow chart, operations for archiving data in accordance with certain embodiments. Control begins at block 600 with a data mover 134 of a remote host 132 receiving, from an asynchronous remote mirror copy system 115 of a primary storage controller 112, an archive copy operation, where the archive copy operation identifies a list of tracks of data and a location of cloud storage 174 in a cloud infrastructure 160 for storing the data from the tracks. In block 602, the data mover 134 issues, to a secondary storage controller 142, the archive copy operation, where the secondary storage controller 142 archives the data from secondary storage 146 to the cloud storage 174 by invoking a cloud service 172, and where the secondary storage 146 stores data of primary storage 116 of the primary storage controller 112. That is, the secondary storage 146 stores a copy of the data that is stored at the primary storage 116.

With embodiments, the application host 102 may issue a retrieve archived data command to the primary storage controller 112. The remote host 132 may issue a retrieve archived data command to the secondary storage controller 142. The primary storage controller 112 may retrieve data from the cloud storage 174 and store the data in the primary storage 116. The secondary storage controller 142 may retrieve data from the cloud storage 174 and store the data in the secondary storage 146.

Thus, with embodiments, either the primary storage controller 112 or the secondary storage controller 142 may receive the retrieve archived data command to retrieve objects from the cloud storage 174. Then, that storage controller 112, 142 initiates a request to retrieve the objects from the cloud storage 174. That storage controller receives the objects from the cloud storage 174. That storage controller converts the objects to tracks of data. That storage controller stores the tracks of data in volumes in storage (e.g., in primary storage 116 if the primary storage controller received the retrieve archived data command and in secondary storage 146 if the secondary storage controller received the retrieve archived data command). That storage controller allows access to the tracks of data. In certain embodiments, the data in the tracks is returned to the host that issued the retrieve archived data command (i.e., to the application host 102 or the remote host 132).

With embodiments, an asynchronous remote mirror cloud archival copy operation (e.g., from a user or an application) is received at the application site 100. The asynchronous remote mirror cloud archival copy operation defines the location of a dataset (e.g., data in a list of tracks) to be archived and where the data is to be archived by providing the constructs of the cloud storage. This information is transmitted via the asynchronous remote mirror copy system 115 issuing the archive copy operation to the remote site 130. The archive copy operation is then implemented at the remote site 130 to archive the data to the remote cloud storage 174.

With embodiments, the asynchronous remote mirror copy system 115 is an extended Remote Copy (XRC). XRC may be described as a combination of a hardware and software mirroring solution. Updates made to the application site 100 (e.g., a production environment) are provided to the asynchronous remote mirror copy system 115 and mirrored to the remote site 130 (e.g., a disaster recovery site).

With embodiments, a command may be issued using Data Set Services (DSS), which then issues the command describing the data to be archived to the cloud service and describing the cloud constructs of the cloud infrastructure 160. Embodiments remotely issue commands to execute the archival of data to the cloud storage 174 from the secondary storage 146.

With embodiments, enterprise clients with high availability needs use mirroring technology at extended distance for disaster recovery. With embodiments, enterprise clients use cloud storage to archive data while avoiding an increased network strain from local sites that impacts business operations. With embodiments, enterprise clients do not need to know cloud constructs in order to archive data to cloud storage.

Figure 7:
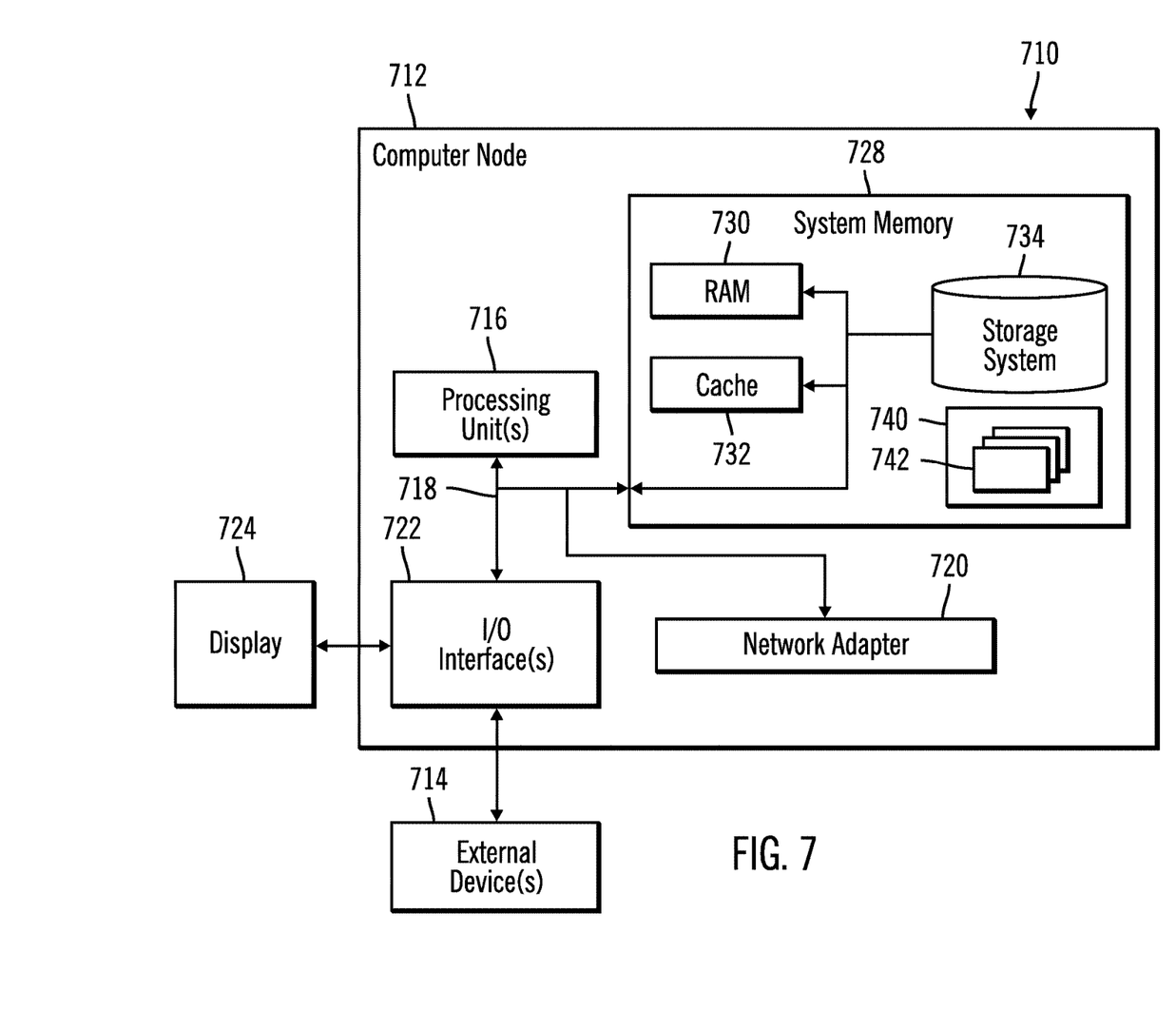
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the application host 102, the primary storage controller 112, the remote host 132, the secondary storage controller 142, and the cloud node 170 may each have the architecture of computer node 712.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
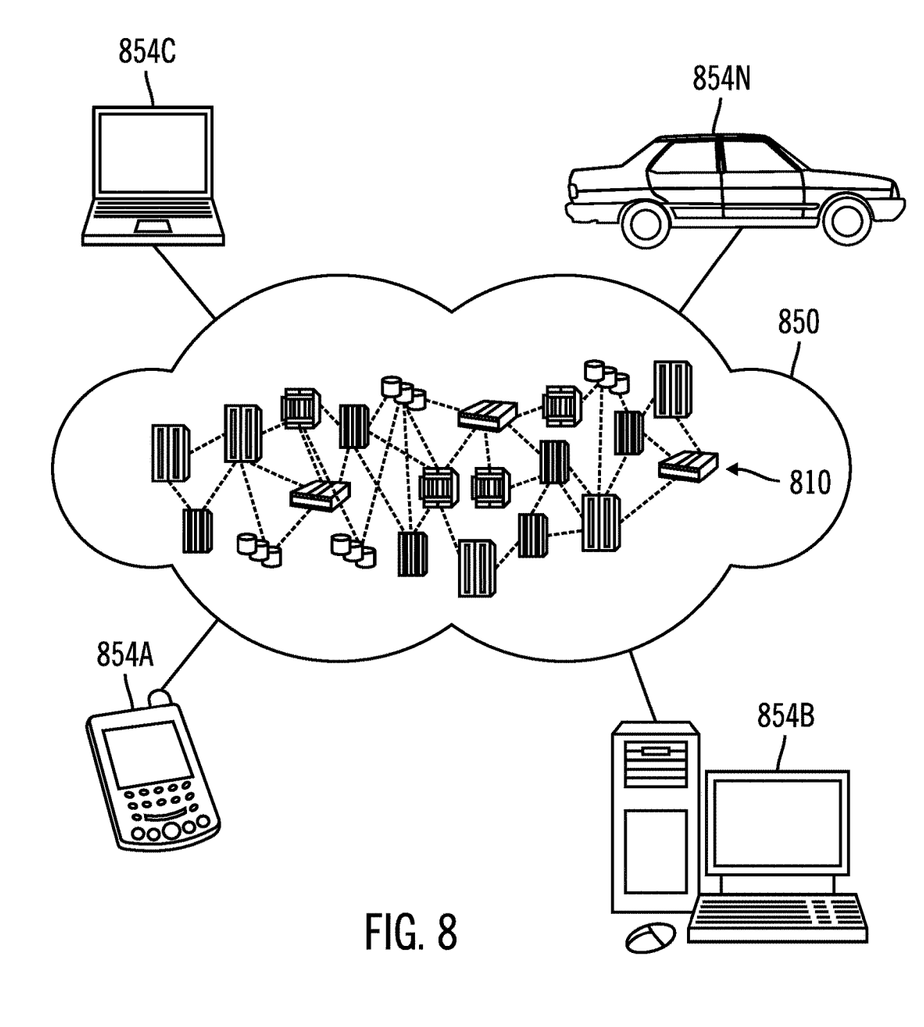
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
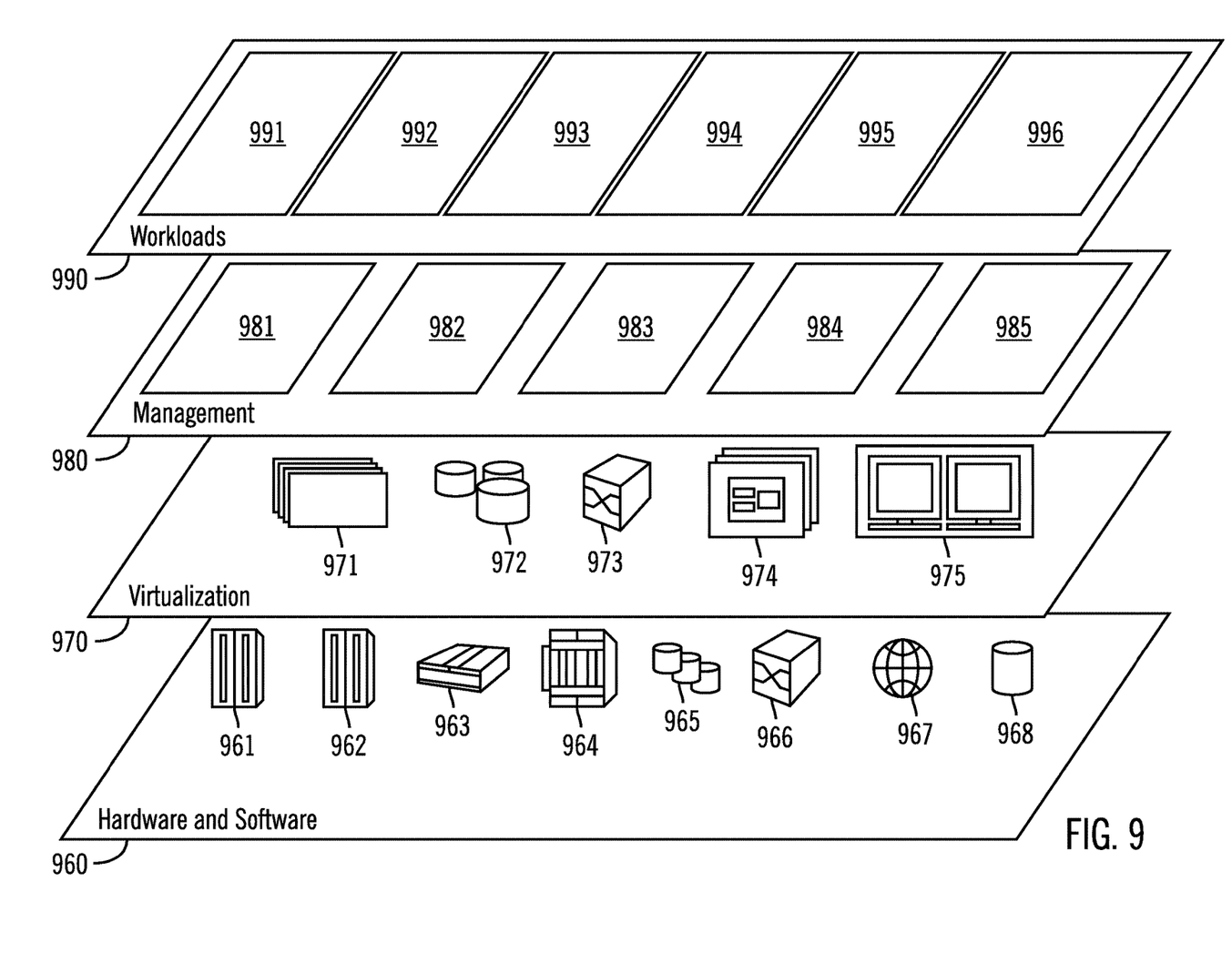
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and asynchronous remote mirror cloud archival 996

Thus, in certain embodiments, software or a program, implementing asynchronous remote mirror cloud archival in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
   under control of an asynchronous remote mirror copy system of a primary storage controller,
      receiving, from an application host, an asynchronous remote mirror cloud archival copy operation, wherein the asynchronous remote mirror cloud archival copy operation describes a list of tracks of data to be archived and a location in cloud storage to store the data;
      issuing, to a data mover of a remote host, an archive copy operation, wherein the archive copy operation identifies the list of tracks of the data and the location of the cloud storage in a cloud infrastructure for storing the data from the tracks; and
      receiving, from the data mover, a notification that the archive copy operation has completed successfully, wherein the data mover issues the archive copy operation to a secondary storage controller, and wherein the secondary storage controller archives the data from secondary storage to the cloud storage by invoking a cloud service.

2. The computer program product of claim 1, wherein the primary storage controller receives the asynchronous remote mirror cloud archival copy operation from the application host and passes the asynchronous remote mirror cloud archival copy operation to the asynchronous remote mirror copy system.

3. The computer program product of claim 1, wherein the secondary storage stores data of primary storage of the primary storage controller.

4. The computer program product of claim 1, wherein the secondary storage controller generates one or more data objects from the tracks of data, and wherein the secondary storage controller stores the one or more data objects in the cloud storage.

5. The computer program product of claim 1, wherein any of the primary storage controller and the secondary storage controller receive a request to retrieve objects from the cloud storage from any of the application host and the remote host.

6. The computer program product of claim 1, wherein the cloud storage is coupled to the cloud service that stores data into the cloud storage and retrieves data from the cloud storage.

7. The computer program product of claim 1, wherein the archive copy operation comprises a store record set command.

8. A computer system comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more computer-readable memories, to perform operations comprising:
   under control of an asynchronous remote mirror copy system of a primary storage controller,
      receiving, from an application host, an asynchronous remote mirror cloud archival copy operation, wherein the asynchronous remote mirror cloud archival copy operation describes a list of tracks of data to be archived and a location in cloud storage to store the data;
      issuing, to a data mover of a remote host, an archive copy operation, wherein the archive copy operation identifies the list of tracks of the data and the location of the cloud storage in a cloud infrastructure for storing the data from the tracks; and
      receiving, from the data mover, a notification that the archive copy operation has completed successfully, wherein the data mover issues the archive copy operation to a secondary storage controller, and wherein the secondary storage controller archives the data from secondary storage to the cloud storage by invoking a cloud service.

9. The computer system of claim 8, wherein the primary storage controller receives the asynchronous remote mirror cloud archival copy operation from the application host and passes the asynchronous remote mirror cloud archival copy operation to the asynchronous remote mirror copy system.

10. The computer system of claim 8, wherein the secondary storage stores data of primary storage of the primary storage controller.

11. The computer system of claim 8, wherein the secondary storage controller generates one or more data objects from the tracks of data, and wherein the secondary storage controller stores the one or more data objects in the cloud storage.

12. The computer system of claim 8, wherein any of the primary storage controller and the secondary storage controller receive a request to retrieve objects from the cloud storage from any of the application host and the remote host.

13. The computer system of claim 8, wherein the cloud storage is coupled to the cloud service that stores data into the cloud storage and retrieves data from the cloud storage.

14. The computer system of claim 8, wherein the archive copy operation comprises a store record set command.

15. A computer-implemented method, comprising:
under control of an asynchronous remote mirror copy system of a primary storage controller,
receiving, from an application host, an asynchronous remote mirror cloud archival copy operation, wherein the asynchronous remote mirror cloud archival copy operation describes a list of tracks of data to be archived and a location in cloud storage to store the data;
issuing, to a data mover of a remote host, an archive copy operation, wherein the archive copy operation identifies the list of tracks of the data and the location of the cloud storage in a cloud infrastructure for storing the data from the tracks; and
receiving, from the data mover, a notification that the archive copy operation has completed successfully, wherein the data mover issues the archive copy operation to a secondary storage controller, and wherein the secondary storage controller archives the data from secondary storage to the cloud storage by invoking a cloud service.

16. The computer-implemented method of claim 15, wherein the primary storage controller receives the asynchronous remote mirror cloud archival copy operation from the application host and passes the asynchronous remote mirror cloud archival copy operation to the asynchronous remote mirror copy system.

17. The computer-implemented method of claim 15, wherein the secondary storage stores data of primary storage of the primary storage controller.

18. The computer-implemented method of claim 15, wherein the secondary storage controller generates one or more data objects from the tracks of data, and wherein the secondary storage controller stores the one or more data objects in the cloud storage.

19. The computer-implemented method of claim 15, wherein any of the primary storage controller and the secondary storage controller receive a request to retrieve objects from the cloud storage from any of the application host and the remote host.

20. The computer-implemented method of claim 15, wherein the cloud storage is coupled to the cloud service that stores data into the cloud storage and retrieves data from the cloud storage.

* * * * *